G. FRINK.
CABLEWAY OPERATING ENGINE.
APPLICATION FILED APR. 8, 1920.
1,395,673.
Patented Nov. 1, 1921.
3 SHEETS—SHEET 1.
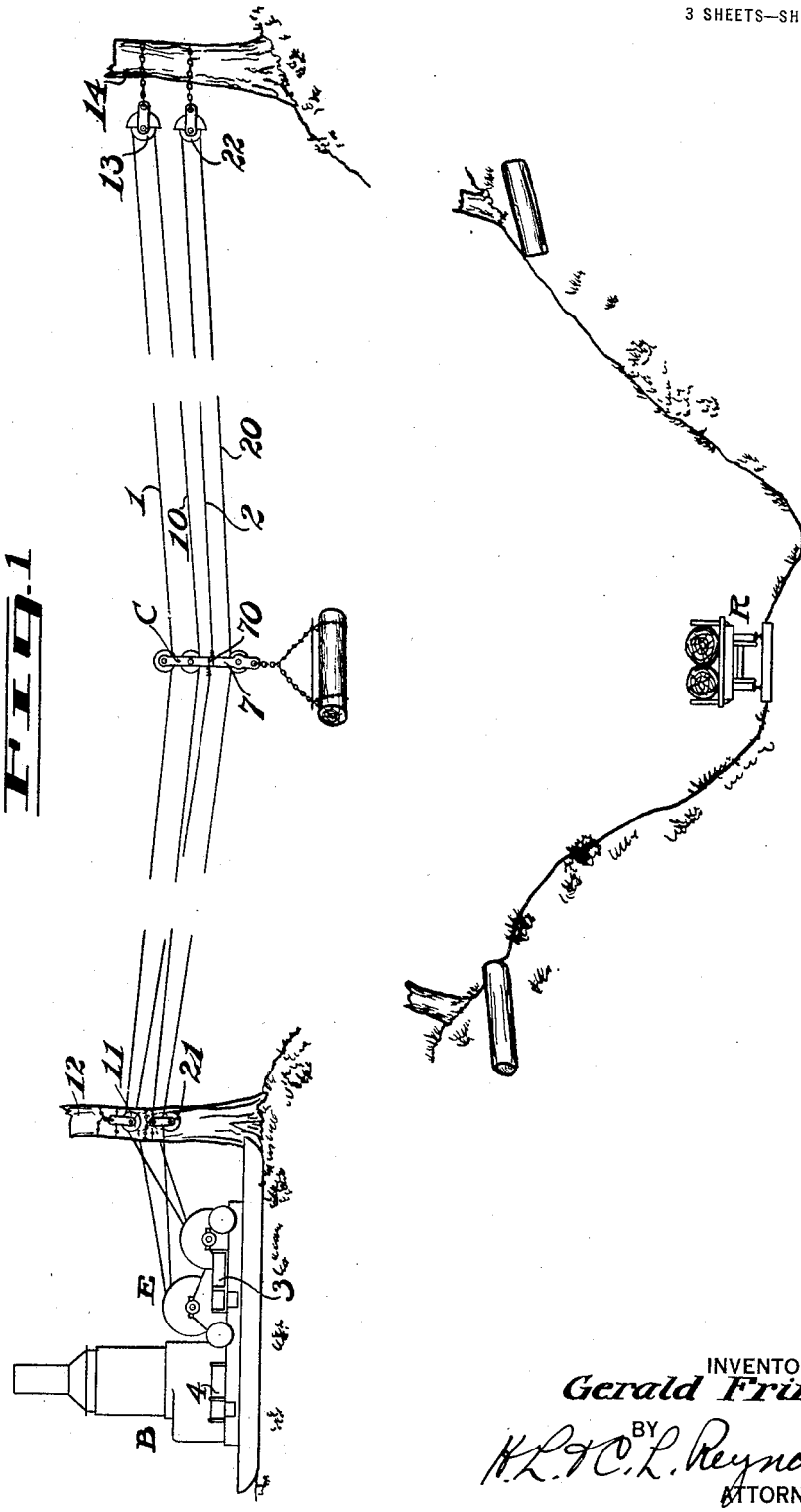
INVENTOR
Gerald Frink
BY
H.L. & C.L. Reynolds
ATTORNEY

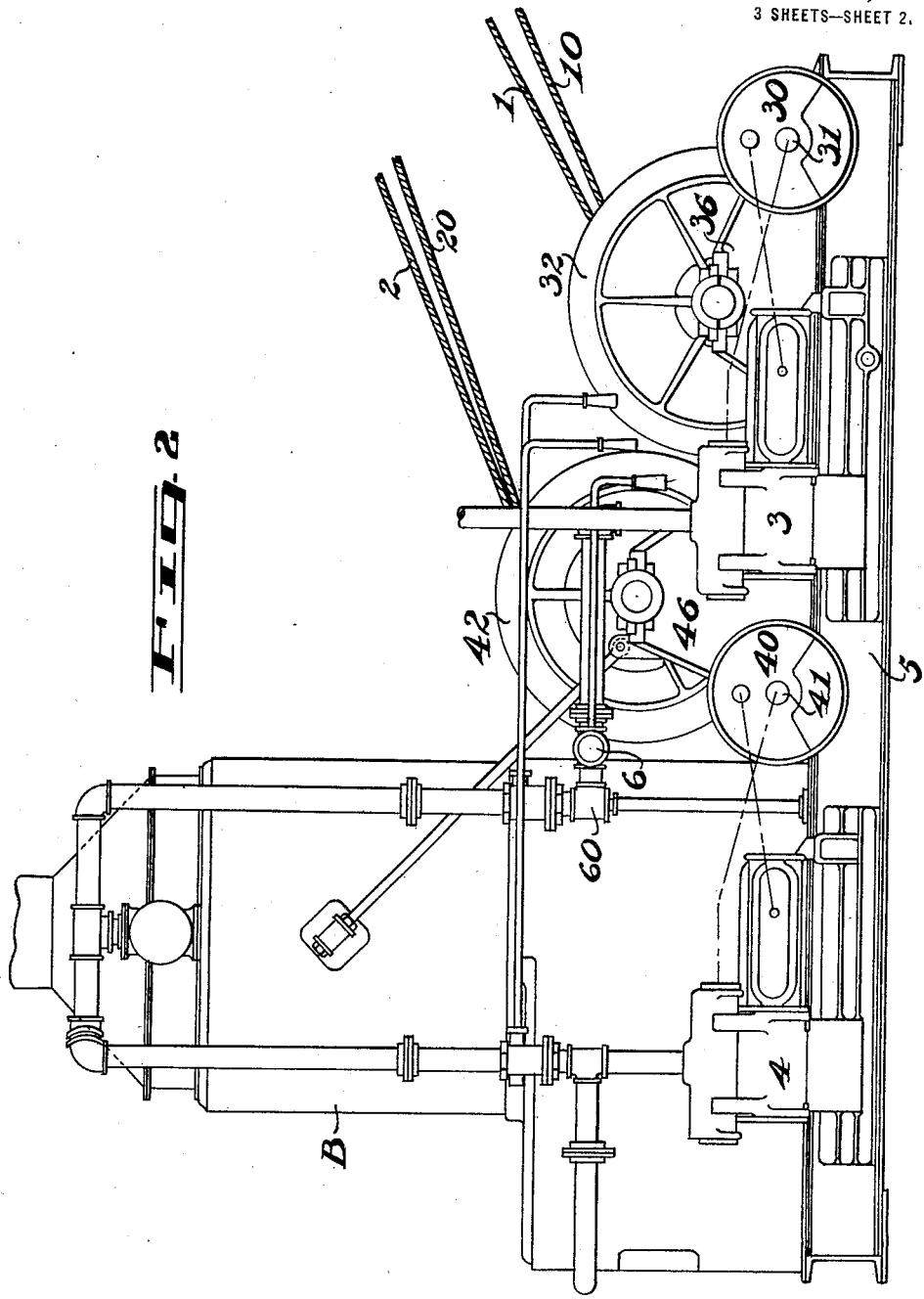

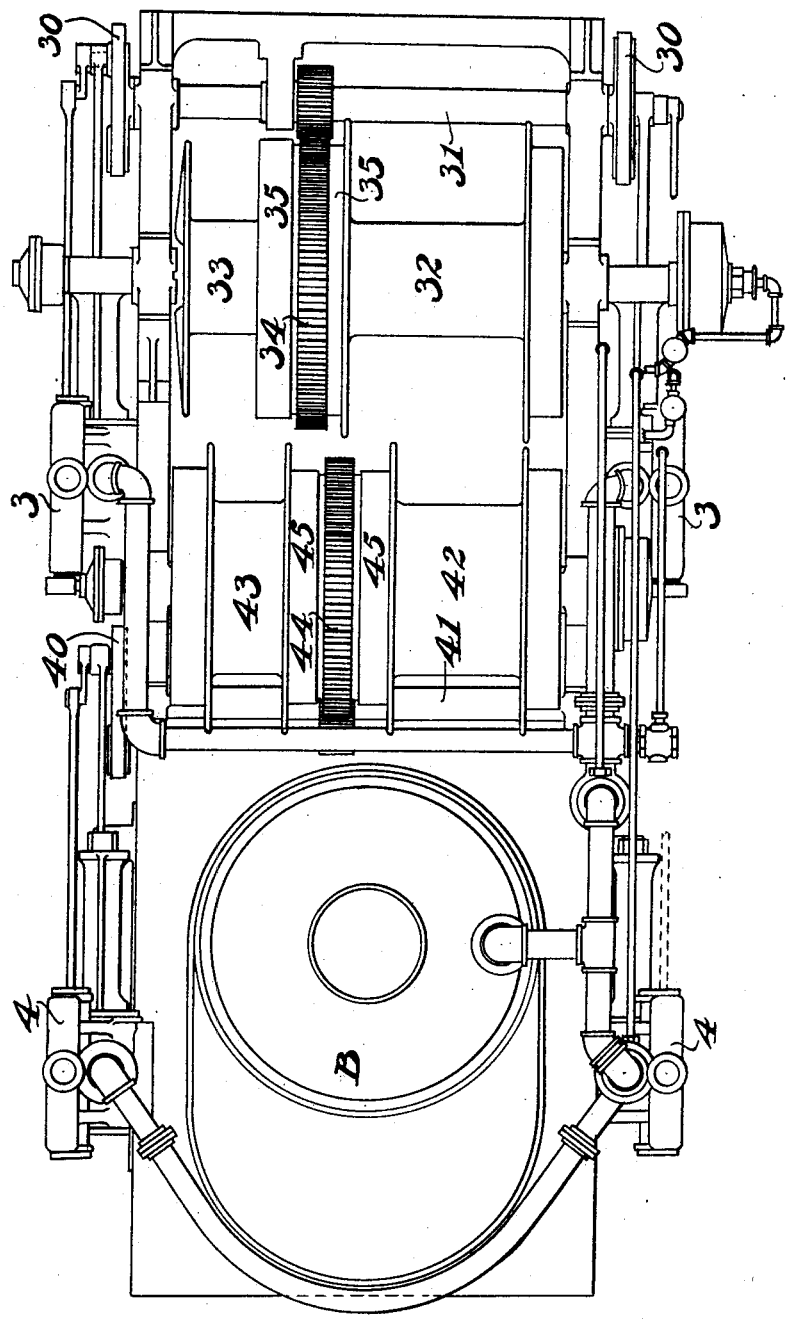

UNITED STATES PATENT OFFICE.

GERALD FRINK, OF SEATTLE, WASHINGTON.

CABLEWAY-OPERATING ENGINE.

1,395,673.   Specification of Letters Patent.   Patented Nov. 1, 1921.

Application filed April 8, 1920. Serial No. 372,272.

*To all whom it may concern:*

Be it known that I, GERALD FRINK, a citizen of the United States of America, and resident of the city of Seattle, in the county of King and State of Washington, have invented certain new and useful Improvements in Cableway-Operating Engines, of which the following is a specification.

My invention relates to power plants, designed to operate a cableway which employs two lines, one forming the trackway or main supporting cable and the other a traversing or hauling cable, both ends of both cables being secured to wind each upon its respective drum, the pair of drums for each line being operable independently of the other pair.

The object of my invention is to provide an engine plant which is capable of operating in the manner described, which shall be so arranged as to be compact, convenient to control and operate and provided with means whereby the various drums may be operated together or separately.

In the accompanying drawings I have shown a form of arrangement for such a power plant which conforms with my invention and will hereinafter describe the construction and operation of the same and then define in the claims what I consider to be novel and what I claim as my invention.

Figure 1 is a diagram illustrative of the manner of installing and operating a logging cableway in accordance with my invention.

Fig. 2 is a side view of the engine plant by which the cableway is operated.

Fig. 3 is a plan view of the same engine plant.

In Fig. 1 has been shown a typical installation of a cableway of the kind for the operation of which my design of engine plant is intended. In this is shown a cableway extending across a valley, the engine E being high up on the side with a railroad track R at a lower point in the valley.

The lines indicated by 1 and 10 are the two ends or runs of the main supporting or trackway cable which is the chief support for the carriage C. This cable passes over suitable guide sheaves, as 11, carried by the head tree 12 and over a sheave 13 carried by the tail tree. The carriage hauling rope 2, 20, has one side secured to the carriage to traverse it, is supported and guided from the head tree 12, as by pulleys 21 and by a pulley 22 carried by the tail tree. Each end of each line is secured to and may be wound upon its particular drum of the engines.

The above plant as has been generically described, is such as has been heretofore used. The carriage is caused to travel along the cableway by operating the traversing line 2, 20, and is raised and lowered by taking in or paying out said ropes so as to vary the length of line which extends between the head and tail trees. The engine which is the subject of my invention has been designed especially for operating such a cableway.

Referring to Figs. 2 and 3, it will be seen that I employ two pairs of engines, the engines of each pair being separated to include between them the drums and boiler. The two engines 3, 3, are connected to crank disks 30 carried by a shaft 31 and the two engines 4, 4, are connected to crank disks 40 carried by a shaft 41. Each pair of engines is supplied with steam from the boiler B independently of the other and may be operated independently.

Two drums are provided and connected to be operated by each pair of engines. The drums 32 and 33 are operated by the engines 3 and the drums 42 and 43 by the engines 4. These are shown as turned through master gears 34 and 44 respectively and friction clutches of standard type located at 35 and 45. Friction brakes of standard construction would also be employed as well as dogs or other positive holding means, as may be desired. As there is nothing in the especial construction of these which is novel with me or which in any particular form is essential to my invention, I have not shown or described these in detail. Any suitable construction of these parts may be employed.

The ends 1 and 10 of the main or trackway cable lead respectively to the drums 32 and 33 and the ends 2 and 20 lead to the drums 43 and 42. The drums 32 and 33 are mounted either upon the frames of the engines 3, 3, or upon a main or sub frame 5, upon which all the parts of the apparatus are mounted. These drums, 32 and 33 it will be noted, are positioned over and just within the shaft 31 of the engine 3 by which they are operated.

The two sets of engines 3 and 4, are placed in tandem relation that is, end to end, and close together, facing in like directions. The two pairs of engines are, or may be, essentially duplicates. The drums 42 and 43 of the second or inner pair are located above and beyond its engine shaft 41, and so as to extend between the cylinder ends of the engines 3, 3 and close to the drums 32 and 33. The drums 42 and 43 are mounted upon frames 46 which are secured to and upon the base frame 5. The frames 36 upon which the drums 32 and 33 are journaled may also be directly supported from the base frame 5.

The above positioning of the drums leaves a clear space between the rear or inner set of engines 4, 4, and back of their shaft 41, in which to place the boiler B. This arrangement makes a compact apparatus in which each pair of drums may be operated independently so as to be able to control the two lines of the cableway as desired and therefore one by which the cableway may be quickly and effectively handled.

As each drum is turned through a friction clutch, in any acceptable manner, any drum may be turned to wind in its end of cable and the friction brake supplied with each drum permits paying out cable as desired and under control.

In addition to the brakes for controlling the paying out of the cable I provide for that engine 3 which is connected with the drums upon which the main or trackway cable 1, 10 winds, means whereby the engine may be employed as a brake for these drums. This consists in attaching a "snubber" valve, 6, between the throttle 60 of this engine and its cylinders. This is used by clutching the drums to turn with the engine, keeping the throttle closed and then opening the snubber valve to control the escape of air compressed in the cylinders by the backward turning of the engine.

By the arrangement illustrated and the relationship between the parts secured by reason of such arrangement, a very compact apparatus is produced in which each drum unit is capable of being operated independently. At the same time the weight of the apparatus is kept at a minimum.

What I claim as my invention is:

1. A cableway operating power plant comprising a base frame, two independently operable hoisting engines, each having two laterally and equally separated cylinder units, said engines of the two units being axially alined and facing in like direction, a transversely extending forward drive shaft which the two forward cylinder units drive, a pair of drums adapted to be independently driven from said shaft, a rear transversely extending shaft to which the two rearmost cylinder units are operatively connected, a pair of drums independently driven from the last named shaft, the first named drums being located rearwardly of the forward driving shaft and the last named drums being located forwardly of the rearmost driving shaft, a trackaway cable having its opposite ends connected to the two drums of one shaft and a traversing cable having its opposite ends connected to the two drums of the other shaft.

2. A cableway operating power plant comprising a base frame, two independently operable hoisting engines, each having two laterally and equally separated cylinder units, said engines of the two units being axially alined and facing in like direction, a forward driving shaft extending transversely of the base frame and lying in front of and being operatively associated with the two forward cylinder units, a transversely extending rear driving shaft lying in front of and being operatively associated with the two rear cylinder units, a pair of drums located rearwardly of the forward driving shaft and adapted to be independently driven from said driving shaft and a pair of drums located forwardly of the rearmost driving shaft and adapted to be independently driven from the last named driving shaft, the last named drums being at a higher elevation than the first named drums, a trackway cable having its opposite ends connected to the two drums of one shaft and a traversing cable having its opposite ends connected to the two drums of the other shaft.

3. A structure as recited in claim 1 in combination with a boiler common to all of said cylinder units and located between the cylinder units of the second pair of engines and rearwardly of the rearmost drums.

4. A cableway operating power plant comprising two pairs of drums, a trackway cable having its opposite ends secured to the two separate drums of one pair, a carriage mounted to travel upon said trackway cable, a traversing line connected to said carriage and having its opposite ends connected to the two separate drums of the other pair of drums, independent engines for operating the drums of the first and second pairs, a boiler for supplying steam to said engines and a snubbing valve in the steam supply line of that engine which drives the trackway cable operating drum, said snubbing valve being located between the throttle valve and the engine cylinders and acting to controllably choke the escape of air compressed by said engine, when said engine is run in reverse direction under the influence of the pull of the trackway cable.

5. In a cableway operating power plant, two pairs of drums, an independent engine for operating each of said pairs of drums, each of the drums of a pair being operable from its engine independently of its mate, a trackway cable having its opposite ends connected to the two drums of one pair, and a traversing cable having its opposite ends connected to the two drums of the other pair.

6. A structure as recited in claim 5. wherein each of said engines comprises two cylinder units and a common operating shaft for the associated pair of drums to which common operating shaft both of the cylinder units of said engine are connected.

Signed at Seattle, King county, Washington this 3rd day of April, 1920.

GERALD FRINK.